United States Patent
Rudick et al.

(10) Patent No.: US 10,426,290 B2
(45) Date of Patent: Oct. 1, 2019

(54) WATER DISTRIBUTION SYSTEM FOR A BEVERAGE DISPENSER

(71) Applicant: The Coca-Cola Company, Atlanta, GA (US)

(72) Inventors: Arthur G. Rudick, Atlanta, GA (US); Jonathan Kirschner, Powder Springs, GA (US)

(73) Assignee: The Coca-Cola Company, Atlanta, GA (US)

( * ) Notice: Subject to any disclaimer, the term of this patent is extended or adjusted under 35 U.S.C. 154(b) by 551 days.

(21) Appl. No.: 14/202,158

(22) Filed: Mar. 10, 2014

(65) Prior Publication Data

US 2014/0263407 A1  Sep. 18, 2014

Related U.S. Application Data

(60) Provisional application No. 61/781,090, filed on Mar. 14, 2013.

(51) Int. Cl.
*B67D 1/00* (2006.01)
*A47J 31/46* (2006.01)
(Continued)

(52) U.S. Cl.
CPC ............ *A47J 31/46* (2013.01); *B67D 3/0003* (2013.01); *B67D 3/0012* (2013.01);
(Continued)

(58) Field of Classification Search
CPC .. B67D 1/0888; B67D 1/0857; B67D 1/0021; B67D 1/0057; B67D 1/0862;
(Continued)

(56) References Cited

U.S. PATENT DOCUMENTS 3,120,326 A * 2/1964 Hedeman .............. B08B 9/0323
137/266
3,347,421 A * 10/1967 Yingst .................. B67D 1/0036
222/129.1
(Continued)

FOREIGN PATENT DOCUMENTS

EP  0 165 792 A1  12/1985
EP  2 336 072 A2  6/2011
(Continued)

OTHER PUBLICATIONS

Kates FC Valve Automatic Flow Rate Controller, www.customvalveconcepts.com/flow_control_valve.php.
(Continued)

*Primary Examiner* — Charles Cheyney
(74) *Attorney, Agent, or Firm* — Eversheds Sutherland (US) LLP

(57) ABSTRACT

The present application provides a water distribution system with a flow of water therethrough. The water distribution system may include one or more water lines, a number of flow control passages in communication with the one or more water lines, a number of flow controllers with a number of preset flow rates positioned about the flow control passages, and a number of flow control valves positioned about the flow control passages such that opening one of the flow control valves allows the flow of water to flow through one of the flow control passages with the preset flow rate.

13 Claims, 2 Drawing Sheets

(51) Int. Cl.
*F16K 11/00* (2006.01)
*B67D 3/00* (2006.01)

(52) U.S. Cl.
CPC ............ *B67D 3/0019* (2013.01); *F16K 19/00* (2013.01); *B67D 2210/0006* (2013.01); *Y10T 137/7837* (2015.04)

(58) Field of Classification Search
CPC .. B67D 1/0068; B67D 1/0877; B67D 1/0036; B67D 1/1277; B67D 1/045; B67D 3/0003; B67D 3/0012; B67D 3/0019; B67D 2210/0006; B67D 1/0052; B67D 1/0041; A47J 31/46; F16K 19/00
USPC ....... 222/129.1, 129.4, 132, 145.6, 144.5, 1, 222/146.6, 52, 63, 25; 137/511
See application file for complete search history.

(56) References Cited

U.S. PATENT DOCUMENTS

| | | | | |
|---|---|---|---|---|
| 3,370,753 | A * | 2/1968 | Yingst | B67D 1/0036 137/111 |
| 3,460,717 | A | 8/1969 | Thomas | |
| 3,664,552 | A * | 5/1972 | Carse | B67D 1/0084 222/144.5 |
| 3,991,911 | A * | 11/1976 | Shannon et al. | 222/25 |
| 4,658,988 | A | 4/1987 | Hassell | |
| 4,687,120 | A * | 8/1987 | McMillin | B67D 1/0021 222/1 |
| 4,932,564 | A | 6/1990 | Austin et al. | |
| 4,979,639 | A | 12/1990 | Hoover et al. | |
| 5,549,219 | A | 8/1996 | Lancaster | |
| 5,673,820 | A * | 10/1997 | Green | B67D 1/0036 220/510 |
| 5,716,038 | A * | 2/1998 | Scarffe | B06B 1/0688 251/30.03 |
| 5,755,683 | A | 5/1998 | Houle et al. | |
| 5,765,726 | A * | 6/1998 | Jones | B67D 1/0021 222/129.1 |
| 5,803,320 | A | 9/1998 | Cutting et al. | |
| 5,842,600 | A | 12/1998 | Singleterry et al. | |
| 5,884,813 | A * | 3/1999 | Bordonaro et al. | 222/129.1 |
| 5,935,105 | A | 8/1999 | Manning et al. | |
| 5,950,866 | A | 9/1999 | Lancaster | |
| 6,751,525 | B1 * | 6/2004 | Crisp, III | B67D 1/0057 222/25 |
| 7,757,896 | B2 | 7/2010 | Carpenter et al. | |
| 7,810,676 | B2 * | 10/2010 | Romanyszyn et al. | 222/129.1 |
| 7,861,740 | B2 | 1/2011 | Phallen | |
| 7,997,448 | B1 * | 8/2011 | Leyva | 222/129.1 |
| 8,113,386 | B2 | 2/2012 | Herrick et al. | |
| 8,857,667 | B2 * | 10/2014 | Nevarez | G07F 13/065 222/129.1 |
| 9,434,594 | B2 * | 9/2016 | Kaneko | B67D 1/005 |
| 2006/0157504 | A1 | 7/2006 | Barker et al. | |
| 2006/0288874 | A1 | 12/2006 | Ziesel | |
| 2007/0114244 | A1 * | 5/2007 | Gatipon et al. | 222/129.1 |
| 2007/0267441 | A1 | 11/2007 | Van Opstal et al. | |
| 2009/0159612 | A1 * | 6/2009 | Beavis et al. | 222/52 |
| 2010/0005903 | A1 | 1/2010 | Beavis | |
| 2010/0034943 | A1 | 2/2010 | Kirschner | |
| 2010/0107885 | A1 | 5/2010 | Kirschner et al. | |
| 2010/0116842 | A1 * | 5/2010 | Hecht et al. | 222/1 |
| 2011/0017776 | A1 * | 1/2011 | Metropulos et al. | 222/129.1 |
| 2012/0055954 | A1 | 3/2012 | Hecht | |
| 2012/0192969 | A1 | 8/2012 | Beavis et al. | |
| 2013/0340499 | A1 | 12/2013 | Beavis et al. | |

FOREIGN PATENT DOCUMENTS

| | | |
|---|---|---|
| JP | H11-301794 A | 11/1999 |
| WO | 90/14303 A1 | 11/1990 |
| WO | 91/17948 A1 | 11/1991 |

OTHER PUBLICATIONS

Flo-Miser Rate Controller, www.customvalveconcepts.com/flow_control_flow_miser.php.
Mini-Flow Automatic Flow Rate Controller, www.customvalveconcepts.com/flow_control_mini_flow.php.
I/Q Valve, www.customvalveconcepts.com/valve_iq.php.
International Preliminary Report on Patentability for International Application No. PCT/US2014/022415 dated Jun. 10, 2015.

* cited by examiner

| Source Valve(s) Opened | Control Valve(s) Opened | Flowrate (ml/sec) | Carbonation Level |
|---|---|---|---|
| A | 3 | 60 | Full-Carb. |
| A | 2 | 90 | Full-Carb. |
| A | 1 | 120 | Full-Carb. |
| A | 2 & 3 | 150 | Full-Carb. |
| A | 1 & 3 | 180 | Full-Carb. |
| A | 1 & 2 | 210 | Full-Carb. |
| B | 3 | 60 | Still Water |
| B | 2 | 90 | Still Water |
| B | 1 | 120 | Still Water |
| B | 2 & 3 | 150 | Still Water |
| B | 1 & 3 | 180 | Still Water |
| B | 1 & 2 | 210 | Still Water |
| A | 3 & 4 | 100 | Mid-Carb. |

WATER DISTRIBUTION SYSTEM FOR A BEVERAGE DISPENSER

RELATED APPLICATIONS

The present application claims priority from provisional application Ser. No. 61/781,090, filed on Mar. 14, 2013. Ser. No. 61/781,090 is incorporated herein by reference in full.

TECHNICAL FIELD

The present application and the resultant patent relate generally to beverage dispensers and more particularly relate to beverage dispensers having a water distribution system with a number of preset flow rates for accurate but less expensive flow control.

BACKGROUND OF THE INVENTION

Commercially available beverage dispensers are generally designed for large volume commercial outlets such as restaurants, convenience stores, and the like. The beverage dispensers are intended to dispense large volumes of different beverages within a short amount of time. Beverage dispenser design thus has focused on maximizing overall cooling and dispensing speeds. To accommodate such, the beverage dispensers may be relatively large in size and the components therein may complex and expensive.

Beverage dispensers generally include a number of pumps and other types of flow control devices so as to distribute the various fluids therein. A beverage dispenser must accurately provide a predetermined volume and/or a predetermined flow rate of a first fluid such as a concentrate to be mixed with a predetermined volume and/or a predetermined flow rate of a second fluid such as a diluent. The failure to provide the predetermined volumes or the predetermined flow rates of the fluids may result in an improperly mixed and unsatisfactory beverage. The pumps and other types of flow control devices, however, may be relatively expensive and may require regular cleaning and maintenance.

There is thus a desire for a beverage dispenser with an improved distribution system for water and other fluids. Preferably such an improved water distribution system may provide accurate and reliable flows of water and other fluids but without the complexity and costs generally involved with known beverage dispenser pumps and other types of flow control devices.

SUMMARY OF THE INVENTION

The present application and the resultant patent thus provide a water distribution system with a flow of water therethrough. The water distribution system may include one or more water lines, a number of flow control passages in communication with the one or more water lines, a number of flow controllers with a number of preset flow rates positioned about the flow control passages, and a number of flow control valves positioned about the flow control passages such that opening one of the flow control valves allows the flow of water to flow through one of the flow control passages with the preset flow rate.

The present application and the resultant patent further provide a method of providing a beverage in a beverage dispenser. The method may include the steps of providing a number of flow control passages with a number of predetermined flow rates therethrough, opening a flow control valve on one of the flow control passages, flowing water through the flow control passage at the predetermined flow rate to a nozzle, and pumping a flow of a concentrate to the nozzle to create the beverage.

The present application and the resultant patent further may provide a beverage dispensing system for mixing a flow of water and a flow of a concentrate. The beverage dispensing system may include a number of flow control passages for the flow of water, a number of preset flow controllers positioned about the flow control passages, a number of flow control valves positioned about the flow control passages, and a concentrate pump for the flow of concentrate.

The present application and the resultant patent further may provide a beverage dispensing system for mixing a flow of a diluent and a flow of a concentrate. The beverage dispensing system may include a number of flow control passages for the flow of diluent, a number of preset flow controllers positioned about the flow control passages, a number of flow control valves positioned about the flow control passages, and a concentrate pump for the flow of concentrate.

These and other features and improvements of the present application and the resultant patent will become apparent to those of ordinary skill in the art upon review of the following detailed description when taken in conjunction with the several drawings and the appended claims.

DETAILED DESCRIPTION

The present application thus describes a beverage dispenser with an improved distribution system for water and other fluids. Preferably such an improved water distribution system may provide accurate and reliable flows of water and other fluids but without the complexity and costs generally involved with known beverage dispenser pumps and other types of flow control devices.

Figure 1:
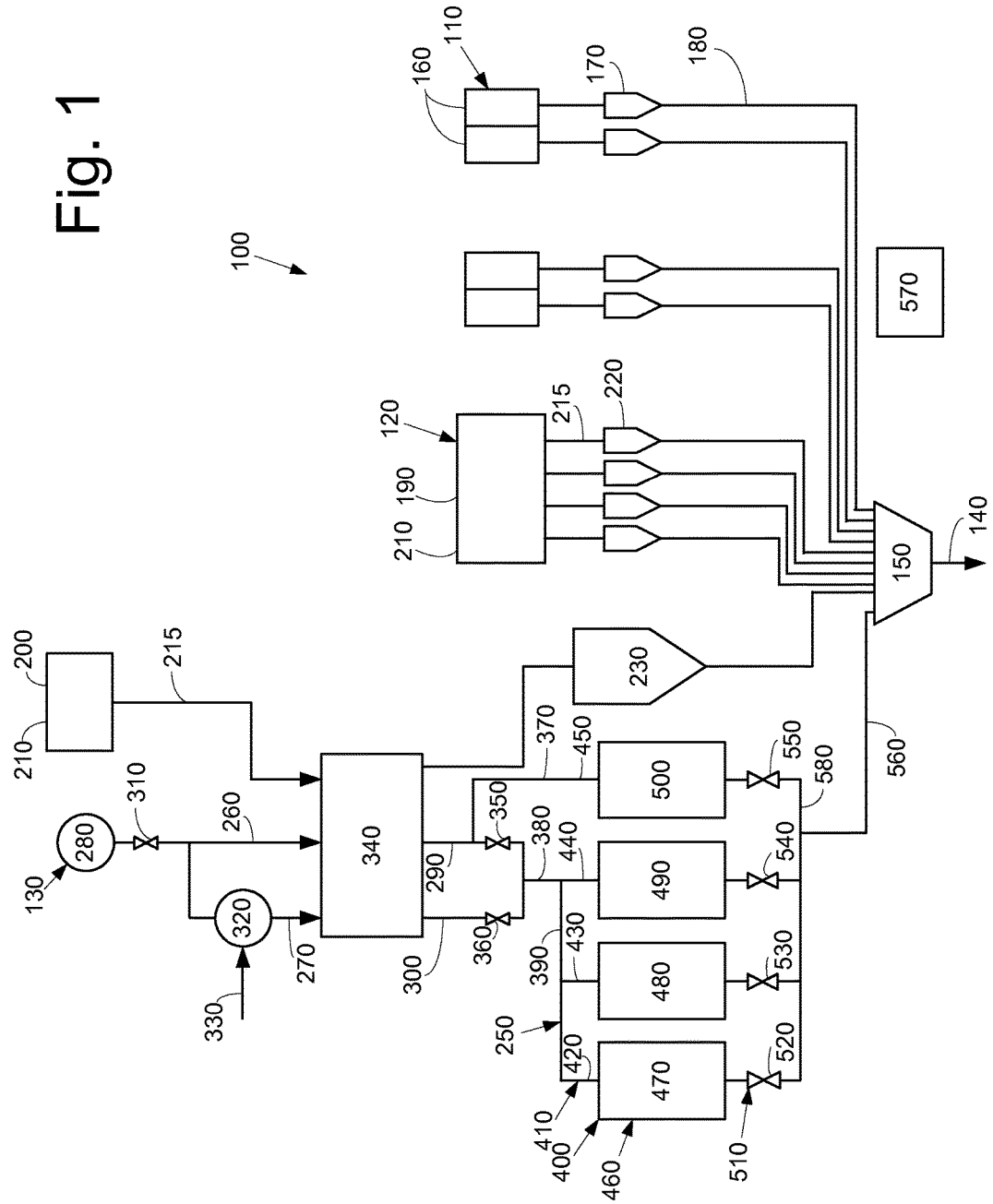
FIG. 1 is a schematic diagram of a beverage dispenser with a water distribution system as may be described herein.

Referring now to the drawings, in which like numerals refer to like elements throughout the several views, FIG. 1 shows a schematic diagram of a beverage dispensing system 100 as may be described herein. Generally described, the beverage dispensing system 100 may mix a number of fluids such as one or more concentrates 110, one or more sweeteners 120, and one or more diluents 130 to form any number of different beverages 140. Any number of fluids may be mixed herein in any volume or order. Other types of fluids and other types of ingredients also may be used herein. The dispensed beverages 140 may be chilled, heated, or at any temperature.

The fluids in the beverage dispensing system 100 may be mixed together in or about a dispensing nozzle 150. The dispensing nozzle 150 may be a multi-flavor dispensing valve capable of mixing a number of fluids at the same time. The dispensing nozzle 150 may be similar to that shown in commonly owned U.S. Pat. No. 8,047,402 B2, entitled "Dispensing Nozzle Assembly" and related patents and applications. U.S. Pat. No. 8,047,402 B2 is incorporated by reference herein in full. Other components and other configurations may be used herein.

The concentrates 110 may be stored in a number of concentrate containers 160. The concentrate containers 160 may be positioned within a housing of the beverage dispensing system 100 or may be positioned external thereto. The concentrates 110 may include a number of conventional beverage concentrates or syrups containing all or most of the ingredients of the beverage 140 other than the diluent 130. Such a concentrate 110 may be stored in conventional bag-in-box containers and the like. The concentrates may have a reconstitution ratio of about three to one (3:1) to about six to one (6:1) or so.

Alternatively, the concentrates 110 may include a number of micro-ingredients. The micro-ingredients may have a reconstitution ratio ranging from about ten to one (10:1), twenty to one (20:1), thirty to one (30:1), or higher. Specifically, many micro-ingredients may be in the range of fifty to one (50:1) to three hundred to one (300:1). The viscosities of the micro-ingredients typically range from about 1 to about 100 centipoise or so. Examples of micro-ingredients include natural and artificial flavors; flavor additives; natural and artificial colors; artificial sweeteners (high potency or otherwise); additives for controlling tartness, e.g., citric acid, potassium citrate; functional additives such as vitamins, minerals, herbal extracts; nutraceuticals; and over-the-counter (or otherwise) medicines such as acetaminophen and similar types of materials. Moreover, the acid and non-acid components of a non-sweetened concentrate also may be separated and stored individually. The micro-ingredients may be liquid, powder (solid), or gaseous form and/or combinations thereof. The micro-ingredients may or may not require refrigeration. Non-beverage substances such as paints, dyes, oils, cosmetics, etc., also may be used. Various types of alcohols may be used as micro-ingredients.

An example of a beverage dispenser using micro-ingredients is shown in commonly owed U.S. Pat. No. 7,757,896 B2, entitled "Beverage Dispensing System" and related patents and applications. U.S. Pat. No. 7,757,896 B2 is incorporated by reference herein in full. An example of the separation of acid and non-acid components is shown in commonly owned U.S. Patent Publication No. 2007/0212468 A1, entitled "Methods and Apparatuses for Making Compositions Comprising an Acid and an Acid Degradable Component and/or Compositions Comprising a Plurality of Selectable Components." U.S. Patent Publication No. 2007/0212468 A1 is incorporated by reference herein in full.

The concentrates 110 may be pumped from the concentrate containers 160 to the dispensing nozzle 150 by a number of concentrate pumps 170 via a number of concentrate lines 180. The concentrate pump 170 may be a positive displacement pump or a similar type of device. Such a positive placement pump may provide accurate portion control for the more highly concentrated micro-ingredients as compared to conventional concentrates. The positive displacement pump may be a vibration or a solenoid pump, a gear pump, an annular pump, a peristaltic pump, a syringe pump, a piezo pump, or any other type of positive displacement device that is designed to pump a fixed displacement for each pump cycle. Examples include vibration pumps sold by the Ulka Coffee Division of CEME S.p.A. of Italy under the designations "Series E" or "Series HF" and the like. Other types of concentrate pumps 170 and the like may be used herein.

The sweeteners 120 may include one or more non-nutritive sweeteners 190 or a high fructose corn syrup 200. Other types of sweeteners 120 such as a sugar solution and the like also may be used herein. The sweeteners 120 may be stored in a sweetener container 210. The sweetener container 210 may be a conventional bag-in-box container and the like. The non-nutritive sweetener 190 may be pumped from the sweetener container 210 to the nozzle 150 via a sweetener pump 220 via a sweetener line 215. The sweetener pump 220 may be a positive displacement pump similar to the concentrate pumps 170 described above. The high fructose corn syrup 220 from the sweetener container 210 may be pumped to the nozzle 150 via a controlled gear pump 230 and the like. The controlled gear pump 230 may accommodate the higher viscosity typically found with the high fructose corn syrup 200 and the like. Other components and other configurations may be used herein.

The beverage dispensing system 100 may include a water distribution system 250 as may be described herein. The water distribution system 250 may deliver a flow of plain water 260 and/or a flow of carbonated water 270 to the dispensing nozzle 150 at a predetermined flow rate. The water distribution system 150 may include a water source 280. The water source 280 may be a conventional source of tap water or any type of water supply. The water distribution system 250 also may use diluents 130 other than water.

The water distribution system 250 may include one or more plain water lines 290 and one or more carbonated water lines 300. One or more pressure regulators 310 may be positioned about the plain water lines 290 and/or the carbonated water lines 300. The pressure regulator 310 may be of conventional design. A carbonator 320 may be positioned about the carbonated water line 300. The carbonator 320 may be of conventional design. The carbonator 320 may mix a flow of the plain water 260 with a flow of carbon dioxide 330 to create the flow of carbonated water 270. The flow of plain water 260 and the flow of carbonated water 270 may flow through a cold plate 340. The cold plate 340 may be of conventional design. The cold plate 340 may be any type of heat exchanger to chill the flow of plain water 260 and the flow of carbonated water 270. The flow of high fructose corn syrup 200 and other ingredients also may flow through the cold plate 340.

The water distribution system 250 may include a plain water source valve 350 positioned on the plain water line 290 and a carbonated water source valve 360 positioned on the carbonated water line 300. The source valves 350, 360 may be conventional solenoid valves and the like. The solenoid valves provide open/shut operation. Other types of valves also may be used herein. The plain water line 290 also may have a mid-carb line 370 that branches off about the plain water source valve 350. (As will be described in more detail below, the plain water 260 from the mid-carb line 370 will merge downstream with a flow of the carbonated water 270.) The plain water line 290 and the carbonated water line 300 may merge at a T-joint 380 downstream of the plain water source valve 350 and the carbonator water source valve 360 or elsewhere. A manifold line 390 may extend downstream of the T-joint 380. Other components and other configurations may be used herein.

The water distribution system 250 may include a water manifold 400 in communication with the flow of plain water 260 and/or the flow of carbonated water 270 via the manifold line 390. Alternatively, the flows of water 260, 270 may reach the water manifold 400 in any number of individual lines or combinations thereof. The water manifold 400 may have any size, shape, or configuration.

The water manifold 400 may include a number of flow control passages 410 extending therethrough. In this example, a first flow control passage 420, a second flow control passage 430, a third flow control passage 440, and a fourth flow control passage 450 are shown although any number of flow control passages 410 may be used herein. The flow control passages 410 may have any size, shape, or configuration. Each flow control passage 410 may include a flow controller 460 therein. In this example, a first flow controller 470, a second flow controller 480, a third flow controller 490, and a fourth flow controller 500 are shown although any number of flow controllers 460 may be used herein. The flow controllers 460 may be conventional mechanical flow control devices. Examples include spring-based flow controllers such as those sold by Custom Valve Concepts of Mansion Heights, Mich. under the designation Kates FC Valve Automatic Flow Controller and the like. Other types of flow controllers 460 may include needle valves, piston valves, and even conventional washers or other types of flow obstructions. The flow control passages 410 and the flow controllers 460 may be arranged in parallel and/or have parallel flow paths.

Each of the flow controllers 460 may be preset for a different flow rate therethrough. For example, the first flow controller 470 may be set for a flow rate of 120 milliliters per second, the second flow controller 480 may be set for a flow rate of 90 milliliters per second, the third flow controller 490 may be set for a flow rate of 60 milliliters per second, and the fourth flow controller 500 may be set for a flow rate of 40 milliliters per second. Other types of flow rates and combinations thereof may be used herein.

Each flow control passage 410 also may include a flow control valve 510. In this example, a first flow control valve 520, a second flow control valve 530, a third flow control valve 540, and a fourth flow control valve 55 are shown although any number of the flow control valves 510 may be used. The flow control valves 510 may be convention solenoid valves and the like. The flow control valves 510 may be similar to the source valves 350, 360 described above and may provide open/shut functionality. Other types of valves may be used herein. A nozzle line 560 may be positioned between the water manifold 500 and the nozzle 150. Other components and other configurations may be used herein.

Overall operation of the beverage dispensing system 100 may be controlled by a controller 570. The controller 570 may be a conventional microprocessor or other type of programmable logic device. The controller 570 may control the operation of the various pumps, valves, and other components herein. The controller 570 may be internal to or remote from the beverage dispensing system 100. Other components and other configurations may be used herein.

Figures 2, 3:
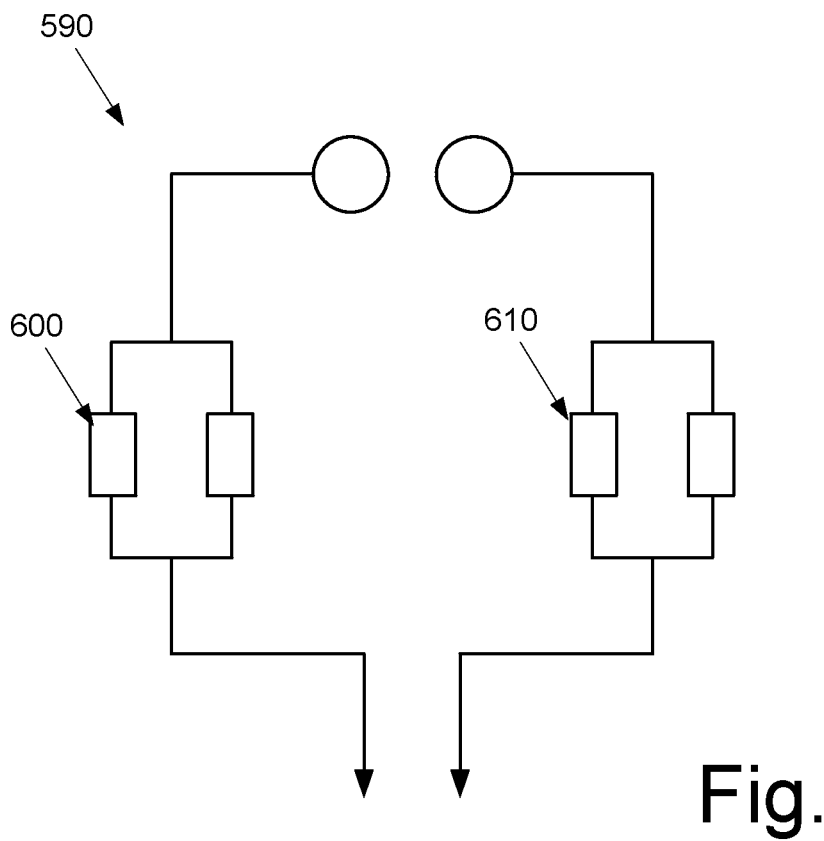
FIG. 2 is a chart showing the operation of the water distribution system of FIG. 1.
FIG. 3 is a schematic diagram of an alternative embodiment of a water distribution system as may be described herein.

In use, the controller 570 may activate the appropriate concentrate pumps 170 to pump the appropriate concentrates 110 to the dispensing nozzle 150. Likewise, the controller 570 may activate the sweetener pump 220 or the controlled gear pump 230 to pump the appropriate sweetener 120 to dispensing nozzle 150. The controller 570 also may activate the water distribution system 250 to open the appropriate source valve 350 and the appropriate flow control valves 510 to allow the carbonated water 270 or the plain water 260 to flow to the dispensing nozzle 150 at the predetermined flow rate for a predetermined length of time. Various operational alternatives are shown in the chart of FIG. 2.

When the carbonated water source valve 360 is opened, the flow of carbonated water 270 flows to the water manifold 400. If the third flow control valve 540 is opened, then the flow rate to the dispensing nozzle 150 would be 60 milliliters per second; if the second flow control valve 530 is opened, then the flow rate will be 90 milliliters per second; and if the first flow control valve 520 is opened, then the flow rate will be 120 milliliters per second. Likewise, a number of the flow control valves 510 may be opened at the same time for an even higher flow rate. Opening up the second flow control valve 530 and the third flow control valve 540 would result in a flow rate of 180 milliliters per second; opening up the first flow control valve 520 and the third flow control valve 540 would result in a flow rate of 180 milliliters per second; and opening up the first flow control valve 520 and the second flow control valve 530 would result in a flow rate of 210 milliliters per second. As is described above, the mid-carb line 370 may branch off of the plain water line 290. As such, opening up the first flow control valve 520 and the fourth flow control valve 530 would result in a combination of plain water 260 and carbonated water 270 for a mid-carb flow 580 with a flow rate of 160 milliliters per second. Other types of flow rates and combinations thereof may be used herein.

Similarly with the plain water source valve 350, opening the third flow control valve 540 result in a flow rate to the dispensing nozzle 150 of 60 milliliters per second; opening the second flow control valve 530 would result in a flow rate of 90 milliliters per second; and opening the first flow control valve 520 would result in a flow rate of 120 milliliters per second. Likewise, multiple flow control valves 510 also may be opened herein. Opening the second flow control valve 530 and the third flow control valve 540 would result in a flow rate of 150 milliners per second; opening the first flow control valve 520 and the third flow control valve 540 would result in a flow rate of 180 milliliters per second; and opening the first flow control valve 520 and the second flow control valve 530 would result in a flow rate of 210 milliliters per second. Other types of flow rates and combinations thereof may be used herein.

The differing flow rates may be selected based on the nature of the concentrates 110 and the sweeteners 120. For example, beverages 140 that may tend to foam may require a slower flow rate. Other beverages may need more of a given ingredient, such as an acid concentrate, than the typical concentrate pumps 170 can typically accommodate. As such, the water flow rate may be slower. Likewise, the water distribution system 250 may accommodate mid-carb beverages. The controller 570 thus selects the appropriate source valve 350 and the appropriate flow control valves 510 for the carbonated water 270 or the plain water 260 to flow to the dispensing nozzle 150 at the predetermined flow rate for the predetermined length of time based upon the selected beverage 140.

The water distribution system 250 thus provides multiple preset flow rates of the plain water 260, the carbonated water 270, and combinations thereof without the use of conventional and expensive pumps and the like. Rather, the water distribution system 250 includes the use of the mechanical flow controllers 460 in the flow control passages 410 as governed by the source valves 350 and the flow control valves 510. Instead of the expensive pumps, the water distribution system 250 may use these mechanical flow controllers and the simple open/shut valves to provide the preset flow rates. The water distribution system 250 thus may be less expensive than known water pumping systems but with the same level of accuracy.

FIG. 3 shows a further embodiment of a water distribution system 590 as may be described herein. In this example, the water distribution system 590 may include one or more carbonated water manifolds 600 and one or more plain water manifolds 610. The carbonated water manifold 600 and the plain water manifold 610 also may include a number of the flow control passages 410 with a number of flow controllers 460 and a number of flow control valve 510 therein. Any number of the flow control passages 410 may be used. Any number of the carbonated water manifolds 600 and the plain water manifolds 610 also may be used together to produce various types of mid-carb flows 580 with differing carbonation levels. Other components and other configurations may be used herein.

Many other combinations of the components and the like described herein may be used in other configurations. For example, the flows of plain water 260 and carbonated water 270 may be sufficient without a mid-carb flow 580. Certain flow control passages 410 and/or flow controllers 460 may be dedicated to a flow of plain water 260 or carbonated water 270 and/or multiple thereof. The flow of plain water 260 may be adjustable while the flow of carbonated water 270 may be fixed or vice versa.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A water distribution system with a flow water therethrough, comprising:
    a water line;
    a water manifold, comprising:
        a plurality of flow control passages in communication with the water line;
        a mechanical flow controller included in each of the plurality of flow control passages;
        wherein the mechanical flow controller included in each of the plurality of flow control passages is preset for different flow rate therethrough;
        a flow control valve included in each of the plurality of flow control passages configured to be selectively opened or shut; and
    a nozzle line positioned between the water manifold and a nozzle.

2. The water distribution system of claim 1, wherein the flow of water comprises a flow of plain water and a flow of carbonated water and wherein a plain water line and a carbonated water line are in communication with the water line.

3. The water distribution system of claim 2, wherein the plain water line comprises a plain water source valve and the carbonated water line comprises a carbonated water source valve.

4. The water distribution system of claim 3, wherein the plain water source valve and the carbonated water source valve comprise a solenoid valve or other type of open/shut valve.

5. The water distribution system of claim 2, wherein the plain water line comprises a mid-carb line branching therefrom.

6. The water distribution system of claim 2, wherein the plain water line and the carbonated water line merge into the water line, wherein the water line is a manifold line.

7. The water distribution system of claim 2, further comprising a carbonator positioned on the carbonated water line.

8. The water distribution system of claim 1, wherein the water line comprises a pressure regulator thereon.

9. The water distribution system of claim 1, wherein the plurality of flow control passages is positioned within the water manifold.

10. The water distribution system of claim 9, further comprising a plurality of water manifolds.

11. The water distribution system of claim 1, wherein the flow control valve comprises a solenoid valve.

12. The water distribution system of claim 1, wherein the nozzle and the nozzle line are downstream of the plurality of flow control passages.

13. The water distribution system of claim 1, further comprising:
    a controller configured to activate the flow control valve positioned about two or more of the plurality of flow control passages such that a flow of water through the nozzle line is at a flow rate that is a combination of the preset flow rate of the mechanical flow controller positioned about the two or more of the plurality of flow control passages.

* * * * *